United States Patent [19]
Norizuki et al.

[11] Patent Number: 5,675,574
[45] Date of Patent: Oct. 7, 1997

[54] SYSTEM AND METHOD FOR CONTROLLING INTERFACE BETWEEN PBX AND ATM MULTIPLEXING TRANSMITTER

[75] Inventors: Reiko Norizuki; Ryuji Hyodo; Susumu Eda; Kenji Tanaka; Katsumi Oomuro; Osamu Sekihata; Hiroyuki Hatta; Tetsuo Nishino, all of Kawasaki, Japan

[73] Assignee: Fujitsu Limited, Kanagawa, Japan

[21] Appl. No.: 627,918

[22] Filed: Apr. 3, 1996

Related U.S. Application Data

[63] Continuation of Ser. No. 343,831, Nov. 22, 1994, abandoned, which is a continuation of Ser. No. 936,272, Aug. 27, 1992, abandoned.

[30] Foreign Application Priority Data

Aug. 28, 1991 [JP] Japan .................................. 3-215656

[51] Int. Cl.$^6$ .......................................... H04L 12/26
[52] U.S. Cl. ................................. 370/230; 370/236
[58] Field of Search ........................ 370/60, 60.1, 94.1, 370/94.2, 95.1, 17, 110.1, 13, 16, 61, 229, 230, 231, 235, 236, 250, 395, 522, 527, 537; 379/2, 8, 32, 137, 138

[56] References Cited

U.S. PATENT DOCUMENTS

| | | | |
|---|---|---|---|
| 4,953,195 | 8/1990 | Ikemori | 370/110.1 |
| 4,993,024 | 2/1991 | Quinquis et al. | 370/94.1 |
| 5,007,048 | 4/1991 | Kowalk | 370/60 |
| 5,014,260 | 5/1991 | Wicklund | 370/94.1 |
| 5,070,498 | 12/1991 | Kakuma et al. | 370/60 |
| 5,119,372 | 6/1992 | Verbeek | 370/94.1 |
| 5,204,857 | 4/1993 | Obara | 370/94.2 |
| 5,280,470 | 1/1994 | Buhrke et al. | 370/17 |
| 5,309,431 | 5/1994 | Tominaga et al. | 370/60 |

FOREIGN PATENT DOCUMENTS 272245 10/1989 Japan.
272939 11/1990 Japan.

*Primary Examiner*—Douglas W. Olms
*Assistant Examiner*—Chau T. Nguyen
*Attorney, Agent, or Firm*—Helfgott & Karas, P.C.

[57] ABSTRACT

In a congestion control system for an interface between a PBX and an ATM multiplexing transmission unit connected to a network via an ATM transmission line, a congestion detecting unit detects a congested state in which the ATM transmission line is congested with traffic. A control unit inhibits a call from the PBX from being sent to the ATM transmission line via the ATM multiplexing transmission unit when the congestion detecting unit detects the congested state.

17 Claims, 12 Drawing Sheets

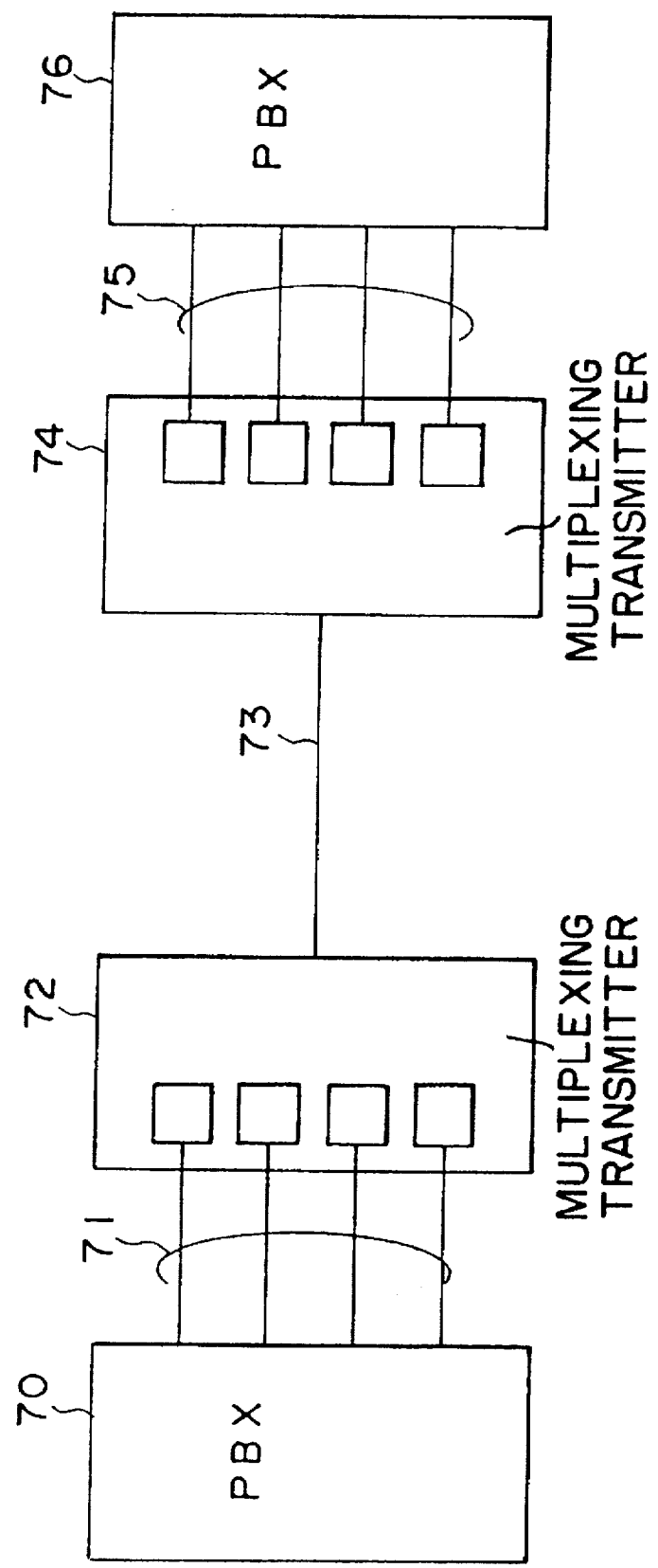
FIG. I PRIOR ART

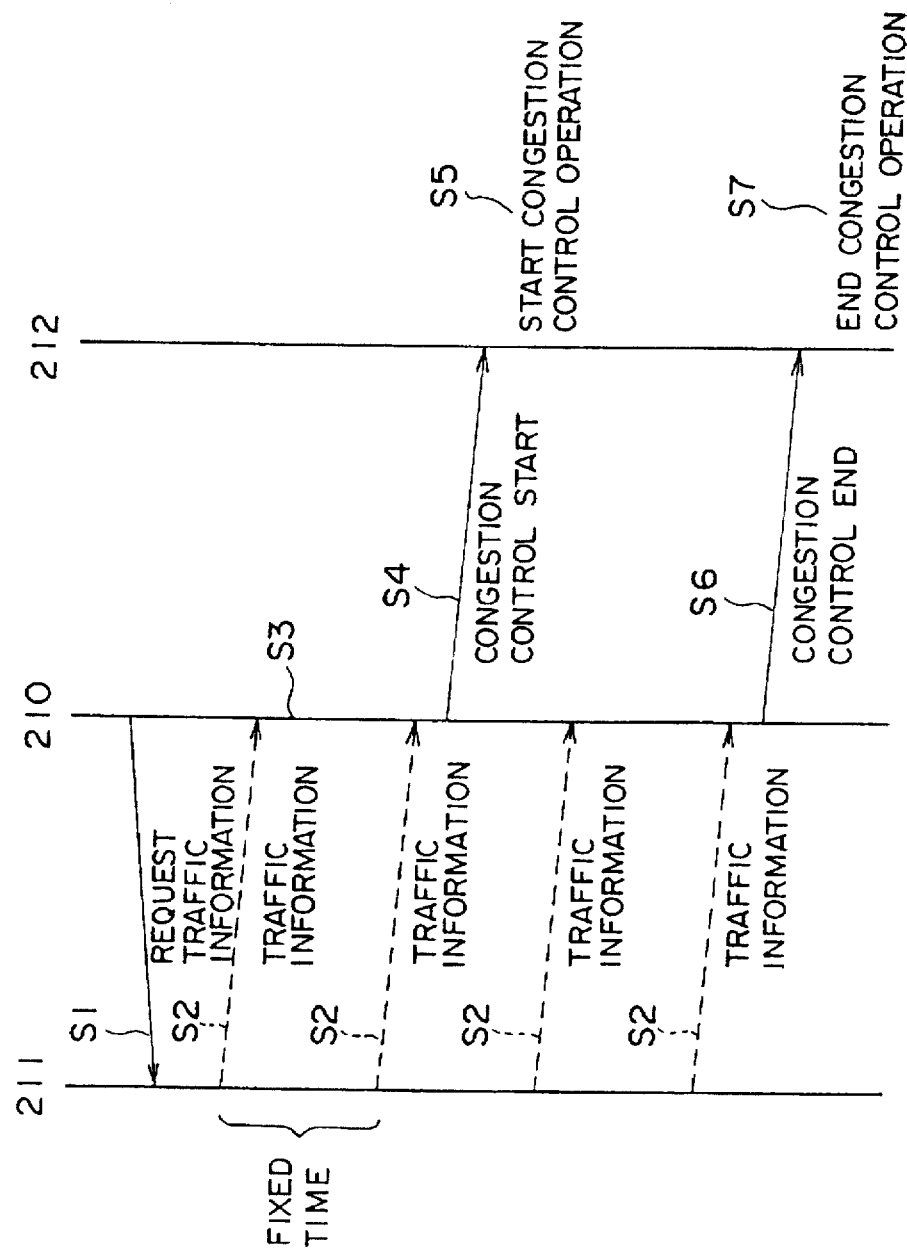

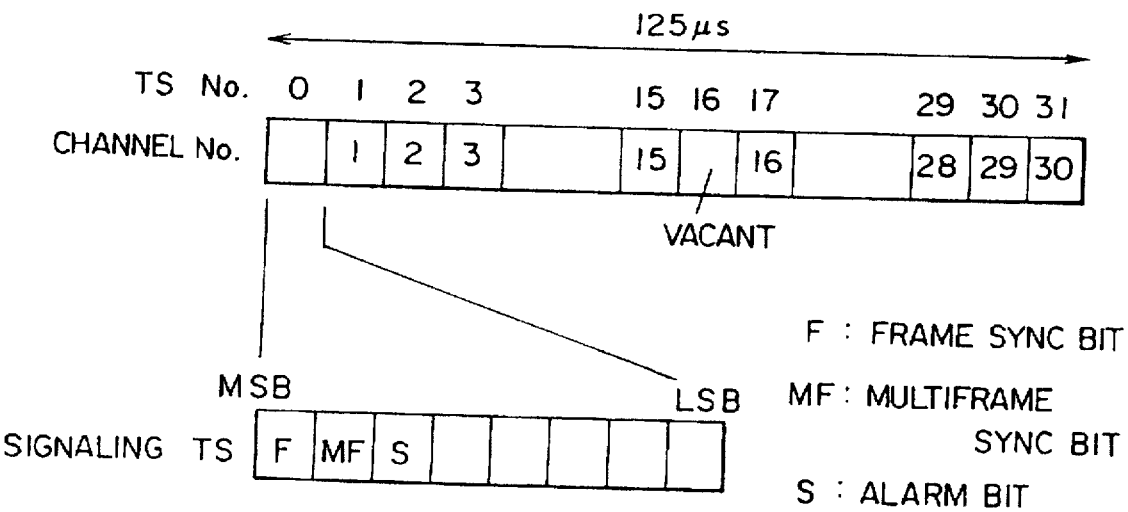

| ITEM | VACANT | BUSY | BLOCKED |
|---|---|---|---|
| LOGICAL VALUE | "1" | "0" | "0" |

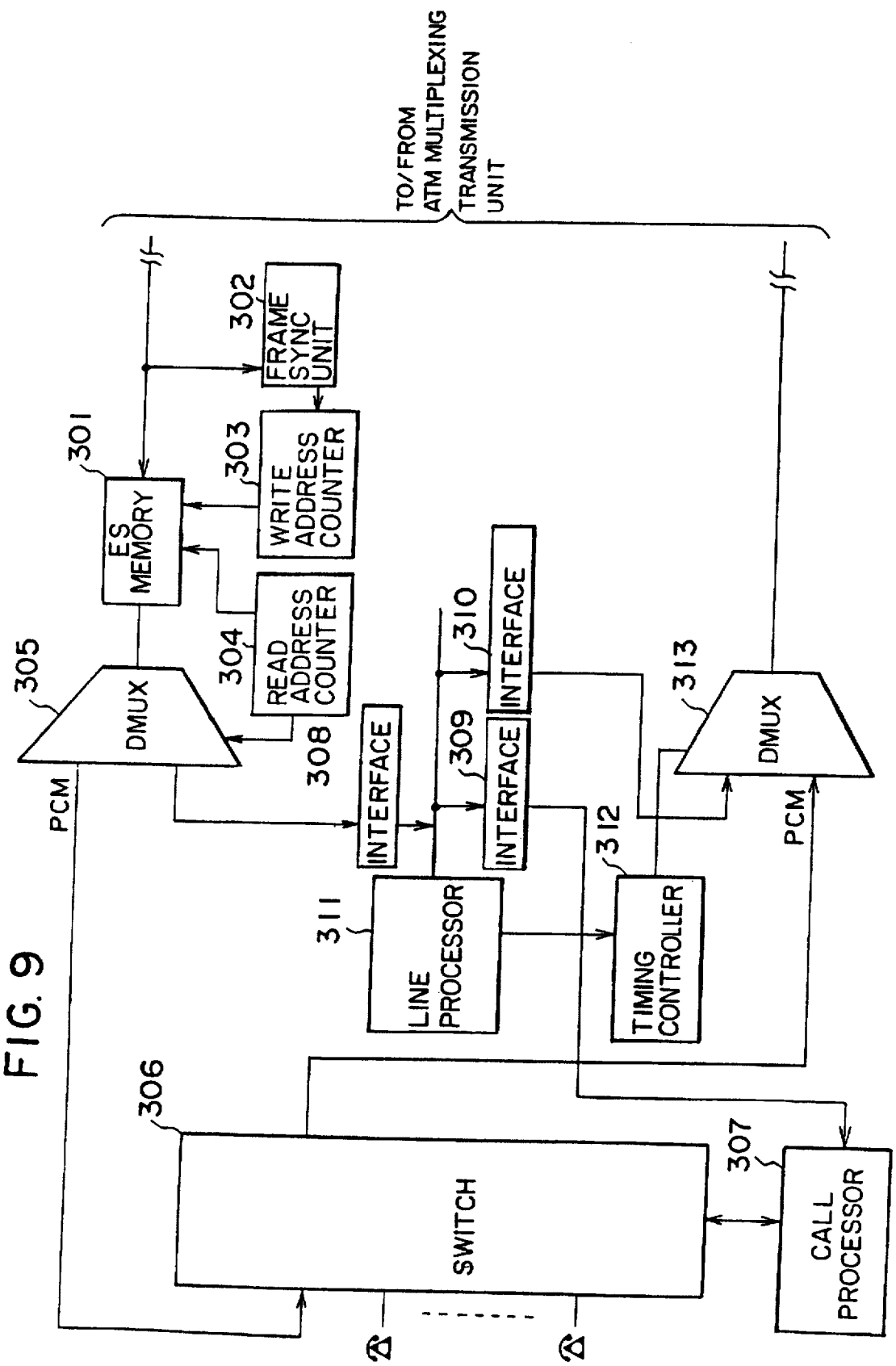

SYSTEM AND METHOD FOR CONTROLLING INTERFACE BETWEEN PBX AND ATM MULTIPLEXING TRANSMITTER

This is a continuation, of application Ser. No. 08/343,831, filed Nov. 22, 1994, abandoned, which is in turn continuation of application Ser. No. 07/936,272 filed Aug. 27, 1992 and now abandoned.

BACKGROUND OF THE INVENTION

1. Field of the Invention

The present invention generally relates to a communications system including private branch exchanges (PBXs) and asynchronous transfer mode (ATM) multiplexing transmission units. More particularly, the present invention is concerned with a system and method for controlling congestion in an interface between a PBX and an ATM multiplexing transmission unit (ATM multiplexing transmitter).

2. Description of the Prior Art

FIG. 1 is a block diagram of some conventional communications modes including PBXs 70 and 76, and synchronous transfer mode (STM) multiplexing transmission units 72 and 74. The PBXs 70 and 76 are located in different zones. The PBX 70 and the STM transmission unit 72 are coupled to each other via an interface 71. The PBX 76 and the STM transmission unit 74 are coupled to each other via an interface 75. The STM transmission units 72 and 74 are coupled to each other via a bi-directional digital transmission line 73.

The PBXs 70 and 76 handle information, such as speech information in either analog or digital form. The interfaces 71 and 75 are either analog interfaces or digital interfaces. The analog interfaces include lines provided for respective analog signals. The digital interfaces include a transmission line via which multiplexed digital signals are transferred. The STM transmission units 72 and 74 use time division multiplexing in which fixed channels are used.

When a terminal (not shown) connected to the PBX 70 calls a terminal (not shown) connected to the PBX 76, a connection between the calling terminal and the ATM transmission unit 72 is made via the interface 71. Then, a channel in the multiplexed transmission path 73 is assigned to the calling terminal. Information from the calling terminal is transferred to the STM transmission unit 74 via the assigned channel in the multiplexed transmission path 73. The information transferred using the assigned channel is separated from other information in the STM transmission unit 74, and is then transferred to the called terminal via the PBX 76.

In the conventional STM multiplexing transmission, each of the STM transmission units 72 and 74 has a predetermined number of channels sufficient to handle heavy traffic in the multiplexed transmission path 73. Each time a call is received, one of the channels is assigned to this call. For example, when all the channels of the multiplexed transmission path 73 directed from the STM transmission unit 72 to the STM transmission unit 74 become busy, the STM transmission unit 72 notifies the PBX 70 that the multiplexed transmission path 73 is busy. In this manner, transmission via the multiplexed transmission path 73 is suppressed.

There has been considerable activity in the development of broadband integrated services digital networks (B-ISDNs) in which ATM technology is applied to multiplexing transmission units used for communications between PBXs. In such B-ISDNs, the STM multiplexing transmission units 72 and 74 are respectively replaced by ATM multiplexing transmission units. Each of the ATM multiplexing transmission units converts an analog signal from a terminal into a digital signal and assembles ATM cells from the digital signal. As is known, an ATM cell consists of a 5-octet header, and a 48-octet information field.

In an ATM transmission path connecting ATM multiplexing transmission units, frequency bands necessary for respective channels are statistically multiplexed. Hence it is expected that the ATM multiplexing transmission line is totally congested with traffic regardless of whether or not some channels are physically idle. For example, when a burst of information is transferred, a frequency band occupied at a peak period temporarily may exceed an expected scheduled frequency band (average frequency band).

When the ATM multiplexing transmission line is in the congested state, ATM cells are sequentially discarded in accordance with priority of abandonment in the ATM multiplexing transmission units. Hence, the communications quality of calls already taking place is degraded.

SUMMARY OF THE INVENTION

It is a general object of the present invention to provide a system and method for controlling congestion in an interface between a PBX and an ATM multiplexing transmission unit, in which system the above disadvantages are eliminated.

A more specific object of the present invention is to provide a system and method for controlling a congestion in an interface between a PBX and an ATM multiplexing transmission unit, which system and method is capable of preventing communications quality from being degraded when an ATM transmission line is congested with traffic.

The above objects of the present invention are achieved by a congestion control system for an interface between a PBX (Private Branch exchange) and an ATM (Asynchronous Transfer Mode) multiplexing transmission unit connected to a network via an ATM transmission line, the congestion control system comprising: congestion detecting means for detecting a congested state in which the ATM transmission line is congested with traffic; and control means, coupled to the congestion detecting means, for inhibiting a call from the PBX from being sent to the ATM transmission line via the ATM multiplexing transmission unit when the congestion detecting means detects the congested state.

The above-mentioned objects of the present invention are also achieved by a congestion control method for an interface between a PBX (Private Branch exchange) and an ATM (Asynchronous Transfer Mode) multiplexing transmission unit connected to a network via an ATM transmission line, the congestion control method comprising the steps of: (a) detecting a congested state in which the ATM transmission line is congested with traffic; and (b) inhibiting a call from the PBX from being sent to the ATM transmission line via the ATM multiplexing transmission unit when the step (a) detects the congested state.

BRIEF DESCRIPTION OF THE DRAWINGS

Other objects, features and advantages of the present invention will become more apparent from the following detailed description when read in conjunction with the accompanying drawings, in which:

FIG. 1 is a block diagram of a conventional communications system including PBXs and STM multiplexing transmission units;

FIG. 4 is a block diagram showing a sequence of the operations of the first and second embodiments of the present invention;

FIG. 6A is a diagram of a 2Mbps frame structure;

FIG. 6B is a diagram of a multiframe structure in which signaling time slots are provided;

FIG. 9 is a block diagram of a PBX; and

DESCRIPTION OF THE PREFERRED EMBODIMENTS

Figure 2A:
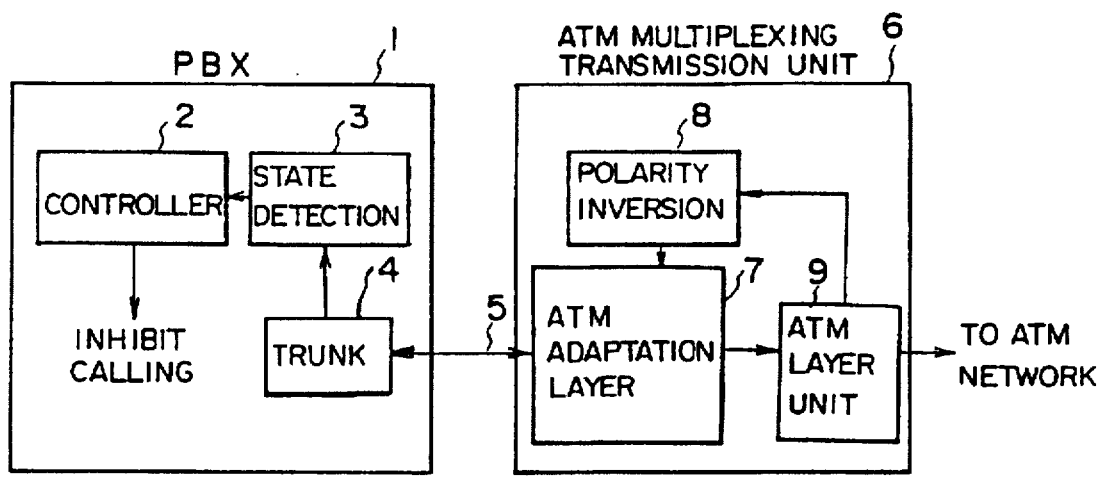
FIG. 2A is a block diagram showing an overview of a first embodiment of the present invention.

FIG. 2A is a block diagram showing an overview of a first embodiment of the present invention in which a PBX 1 and an ATM multiplexing transmission unit 6 are coupled to each other via an analog interface (analog transmission line) 5. The PBX includes a controller 2, a state detection unit 3 and a trunk 4. The ATM multiplexing transmission unit 6 comprises an ATM adaptation layer unit 7, a polarity inverting unit 8, and an ATM layer unit 9. The ATM is prescribed in CCITT recommendations I.361 and I.363, the disclosure of which are hereby incorporated by reference.

The ATM layer unit 9 detects a state in which an ATM multiplexing transmission line connecting the transmission unit 6 and an ATM network (not shown) has been congested with traffic or is about to be congested with traffic. When such a state is detected, the ATM layer unit 9 outputs a congestion detection signal to the polarity inverting unit 8. In response to receipt of the congestion detection signal, the polarity inverting unit 8 inverts the polarity of the analog transmission line connected to the ATM adaptation layer unit 7. The inversion of the polarity of the analog transmission line 5 is detected by the state detection unit 3 in the PBX 1 via the trunk 4. Then, the state detection unit 3 notifies the controller 2 that the polarity of the analog transmission line 5 has been inverted. Thereby, the controller 2 understands that the ATM transmission line is busy. When a terminal (not shown) connected to the PBX 1 calls another terminal connected to another PBX (not shown), the controller 2 does not perform a connection-making process for transferring the call to the ATM transmission unit 6.

Figure 2B:
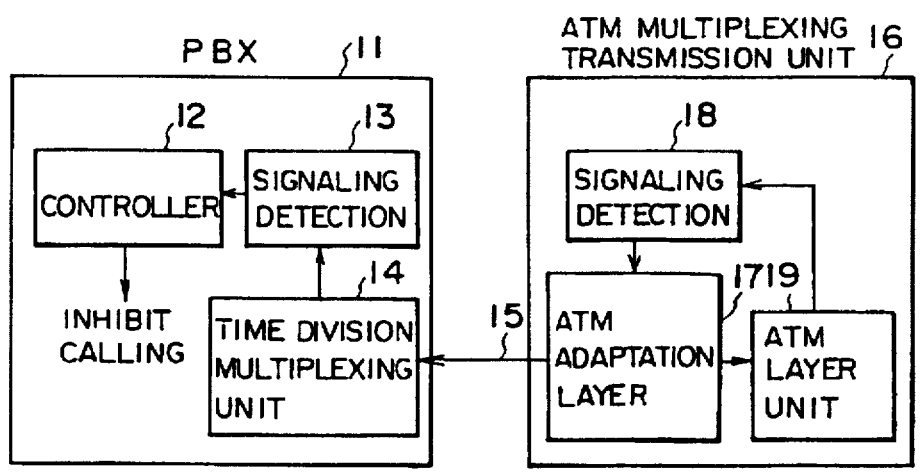
FIG. 2B is a block diagram showing an overview of a second embodiment of the present invention.

FIG. 2B shows an overview of a second embodiment of the present invention in which overview a PBX 11 and an ATM multiplexing transmission unit 16 are coupled to each other via a digital interface (multiplexed digital transmission line) 15. The PBX 11 comprises a controller 12, a signaling detection unit 13, and a time division multiplexing unit 14.

The ATM multiplexing transmission unit 16 comprises an ATM adaptation layer unit 17, a signaling controller 18, and an ATM layer unit 19.

The ATM layer unit 19 detects a state in which an ATM multiplexing transmission line connecting the transmission unit 16 and an ATM network (not shown) has been congested with traffic or is about to be congested with traffic. When such a state is detected, the ATM layer unit 19 outputs a congestion detection signal to the signaling controller 18. The signaling controller 18 sets all signaling bits showing the states of respective channels contained in signals transferred from the ATM adaptation layer unit 17 in a known multiframe structure to values respectively indicating busy states except for signaling bits which have been set to the values respectively indicating the busy channel states. The signals transferred from the ATM adaptation layer unit 17 are transferred, in multiplexed form, to the time division multiplexing unit 14 via the multiplexed transmission line 15. The signaling detector 13 detects the fact that all the signaling bits are set to the values indicating that all the channels are busy. Then the controller 12 inhibits the PBX 11 from making a connection between a terminal (not shown) which generates a call and the ATM multiplexing transmission unit 16.

Figure 3A:
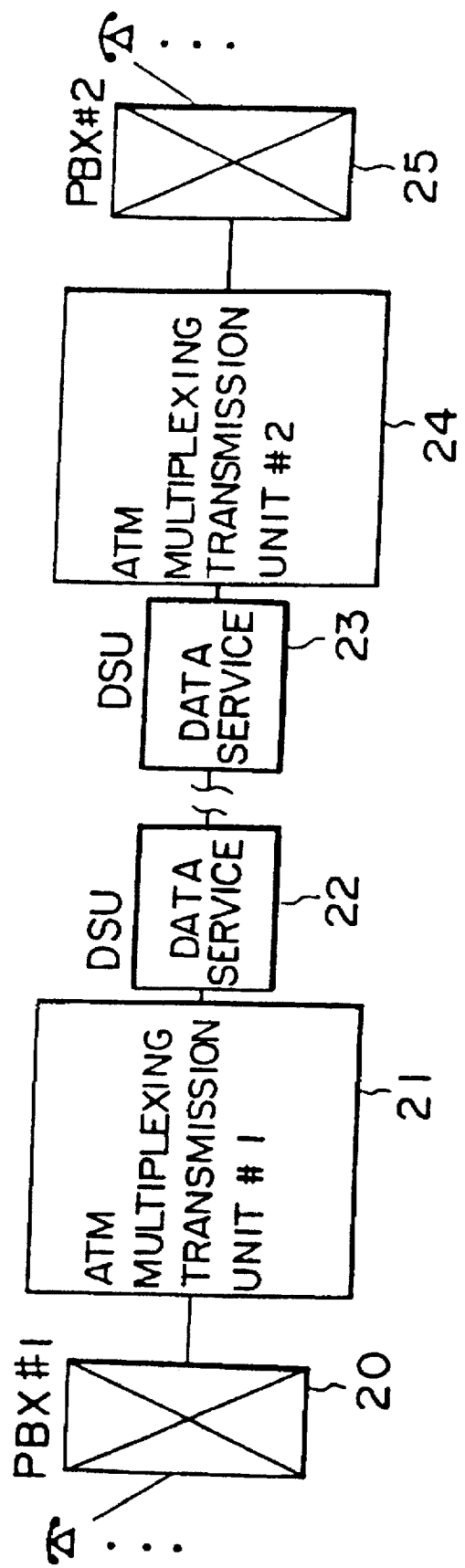
FIG. 3A is a block diagram of a communications system to which the present invention is applied.

FIG. 3A shows the entire configuration of a communications system to which the present invention is applied. The communications system shown in FIG. 3A comprises PBXs 20 (#1) and 25 (#2), ATM multiplexing transmission units 21 (#1) and 24 (#2), and data service units (DSUs) 22 and 23. The ATM multiplexing transmission units 21 and 24 are coupled to each other via the data service units 22 and 23, and a multiplexed digital transmission line. An ATM network (not shown) is provided between the data service units 22 and 23.

Figure 3B:
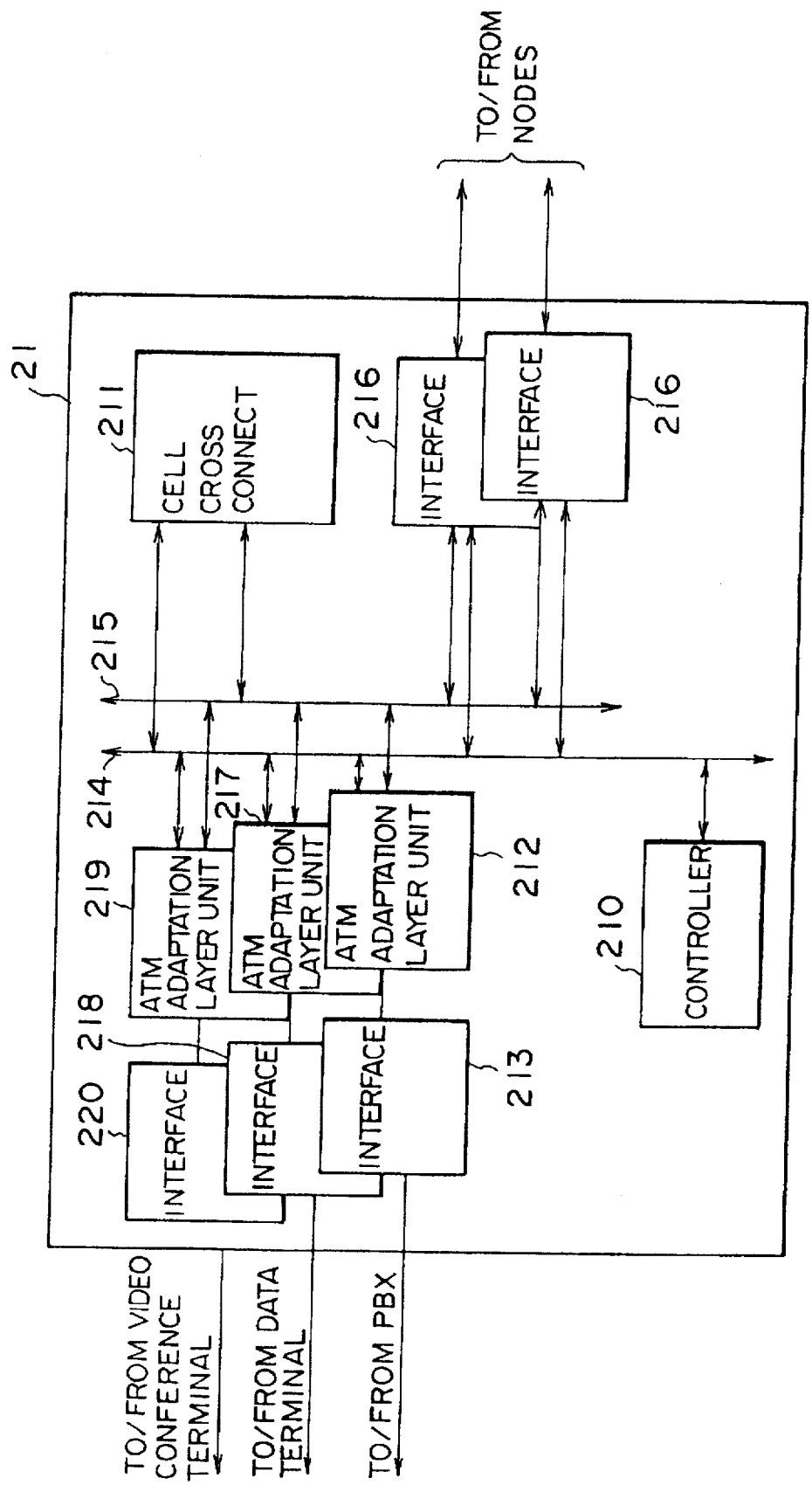
FIG. 3B is a block diagram showing the details of an ATM multiplexing transmission unit shown in FIG. 3A.

As shown in FIG. 3B, the ATM multiplexing transmission unit 21 comprises a controller 210, a cell cross connect unit 211, an ATM adaptation layer unit 212 for speech information, a speech terminal interface unit 213, a control bus 214, a data bus 215 and interface units 216. Further, the ATM multiplexing transmission unit shown in FIG. 3B comprises an ATM adaptation layer unit 217 for data transmission, a data terminal interface unit 218, an ATM adaptation layer unit 219 for image transmission, and a image interface unit 220. The speech terminal interface unit 213 establishes an interface between a PBX and the ATM multiplexing transmission unit. The data terminal interface unit 218 establishes an interface between a data terminal and the ATM multiplexing transmission unit. The image interface unit 220 establishes an interface between an image terminal and the ATM multiplexing transmission unit. The ATM adaptation layer units 212, 217 and 219 are coupled to the control bus 214 and the data bus 215. The cell cross connect unit 211, which is coupled to the control bus 214 and the data bus 215, executes a cell switching operation.

Figure 3C:
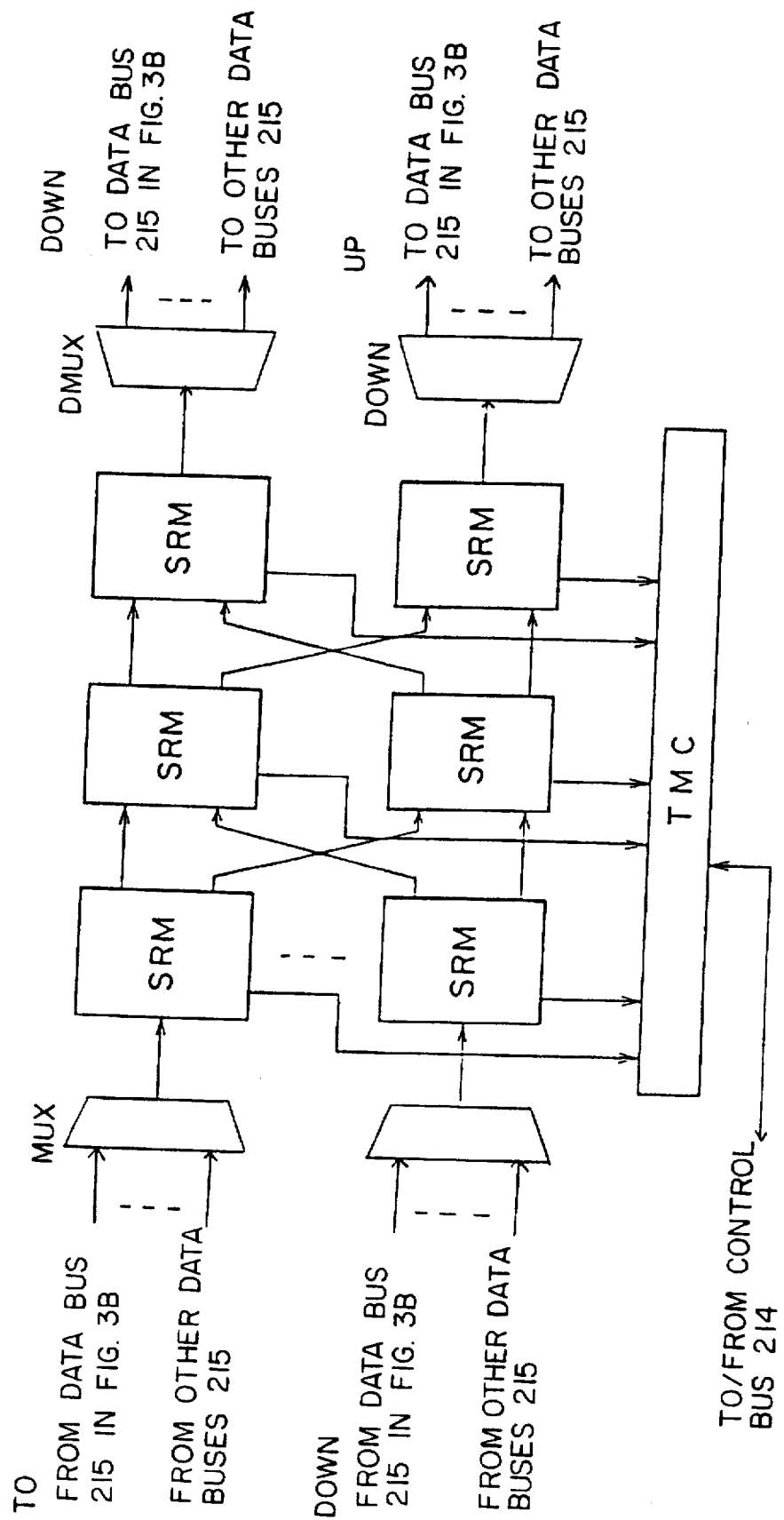
FIG. 3C is a block diagram of a cell cross connect switch shown in FIG. 3B.

As shown in FIG. 3C, the cell cross connect unit 211 comprises, for example, a plurality of self-routing modules SRM, multiplexers MUX, demultiplexers DMUX, data service units DSU, and a traffic monitoring controller TMC. The traffic monitoring controller counts the number of cells held in each of the self-routing modules, and informs the controller 210 of traffic information. It is also possible to employ a traffic monitoring method disclosed in Japanese Laid-Open Patent Application No. 2-272939. The control bus 214 and data bus 215 are data communication paths between the controller 210 shown in FIG. 3B and the units 211–213 and 216–220 shown in FIG. 3B. A sequence which will be described later with reference to FIG. 4 utilizes the buses 214 and 215. The data bus 215, which corresponds to highways in the PBX, functions as cell transferring paths between the ATM adaptation layer 212, 217 and 219 and the cross connect switch 211. Further, the data bus 215 functions as cell transferring paths between the cross connect switch 211 and the interfaces 216 for external lines, such as an ISDN and dedicated digital lines. The multiplexers MUX function to multiplex ATM cells, and the demultiplexers DMUX function to demultiplex ATM cells.

The ATM multiplexing transmission unit is coupled to other nodes via interface units 216, which are coupled to the control bus 214 and the data bus 215. The controller 210 controls the entire operation of the ATM multiplexing transmission unit. The details of the speech terminal interface unit 213 will be described later. The ATM multiplexing transmission unit 24 is configured in the same manner as the ATM multiplexing transmission unit 21.

FIG. 4 shows a sequence executed when the transmission line between the ATM multiplexing transmission units 21 and 24 has been congested with traffic or is about to be congested with traffic. Referring to FIG. 4, the controller 210 in the ATM transmission unit 21 requests the cell cross connect unit 211 to send traffic information to the controller 210 (step S1). The cell cross connect unit 211 counts traffic information in the cell unit, and notifies the controller 210 of the traffic information at fixed intervals (step S2). The controller 210 determines, based on the traffic information from the cell cross connect unit 211, that the transmission line has been congested with traffic or is about to be congested with traffic (step S3). When the result of the above determination is affirmative, the controller 210 sends a command for making a start of a congestion control operation to the ATM adaptation layer unit 212 (step S4). The cell cross connect unit 211 continues to notify the controller 210 of traffic information (step S1) at the fixed intervals (step S1). In response to receipt of the command, the ATM adaptation layer unit 212 starts the congestion control operation, which corresponds to the aforementioned operation of the ATM adaptation layer unit 7 or 17 shown in FIG. 2A or 2B (step S5). When the controller 210 determines that the transmission line is not in the congested state, the controller 210 sends a command indicating termination of the congestion control operation to the ATM adaptation layer unit 212 (step S6). In response to receipt of this command, the ATM adaptation layer unit 212 terminates the congestion control operation (step S7).

Figure 5:
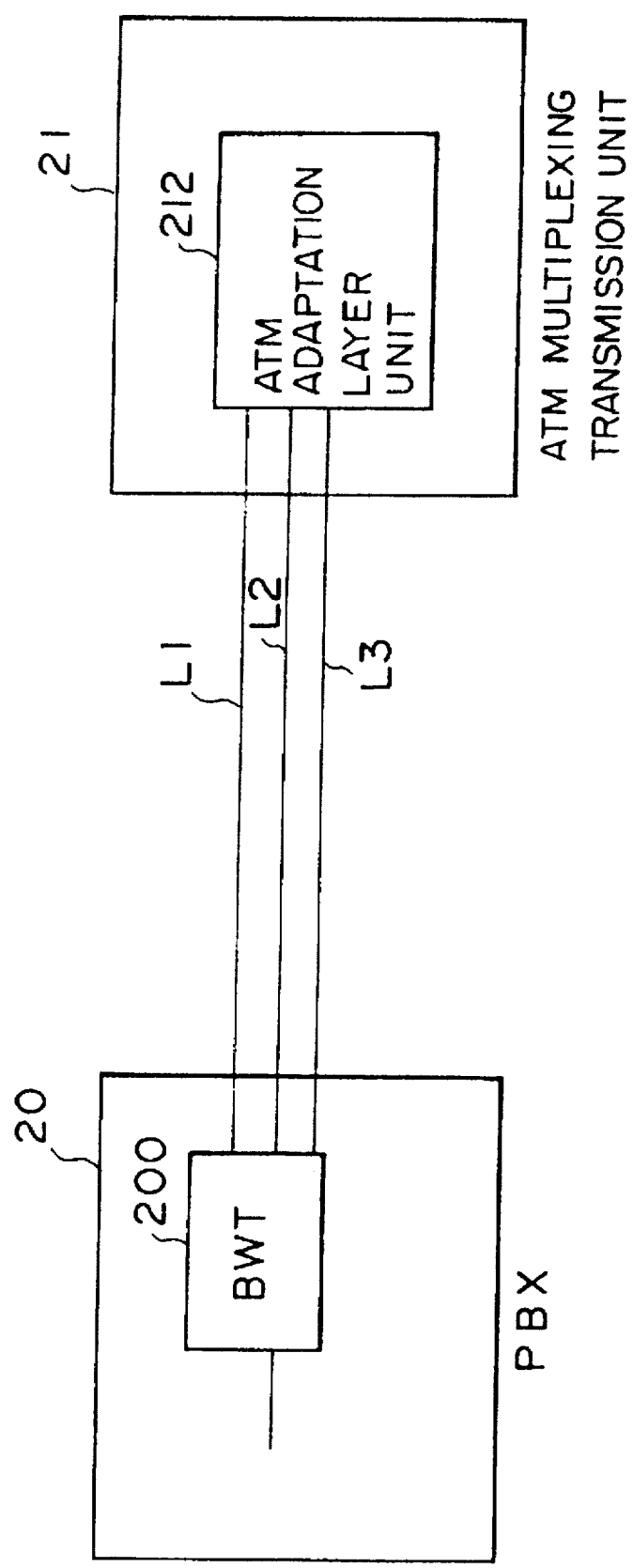
FIG. 5 is a block diagram showing an analog interface.

FIG. 5 shows an analog interface between the PBX 20 and the ATM multiplexing transmission unit 21. The PBX 21 is equipped with a both way trunk (BWT) 200 to which are connected two wires L1 and L2 controlled for the signaling bit, and a line L3 for transferring a speech signal. In actuality, a plurality of trunks 200 are provided in the PBX 20. The two wires L1 and L2 are connected to the ATM adaptation layer unit 212 in the ATM multiplexing transmission unit 21. Similarly, other pairs of wires (not shown) extending from the other trunks (not shown) are connected to the ATM adaptation layer unit 212.

Figure 10A:
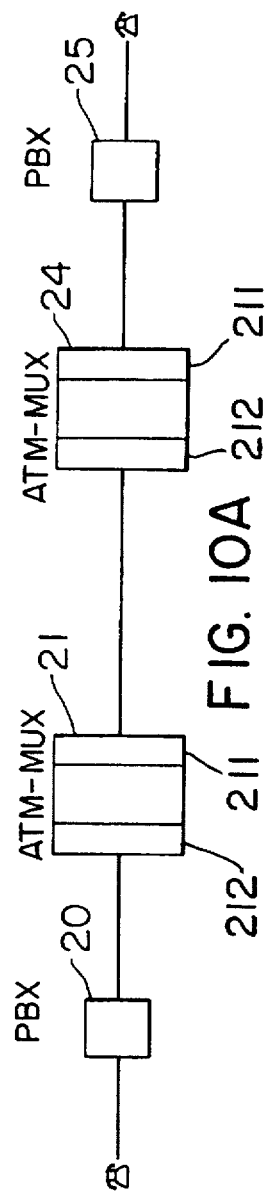
FIG. 10 is a diagram of a sequence for establishing an end-to-end path.
Figure 10B:
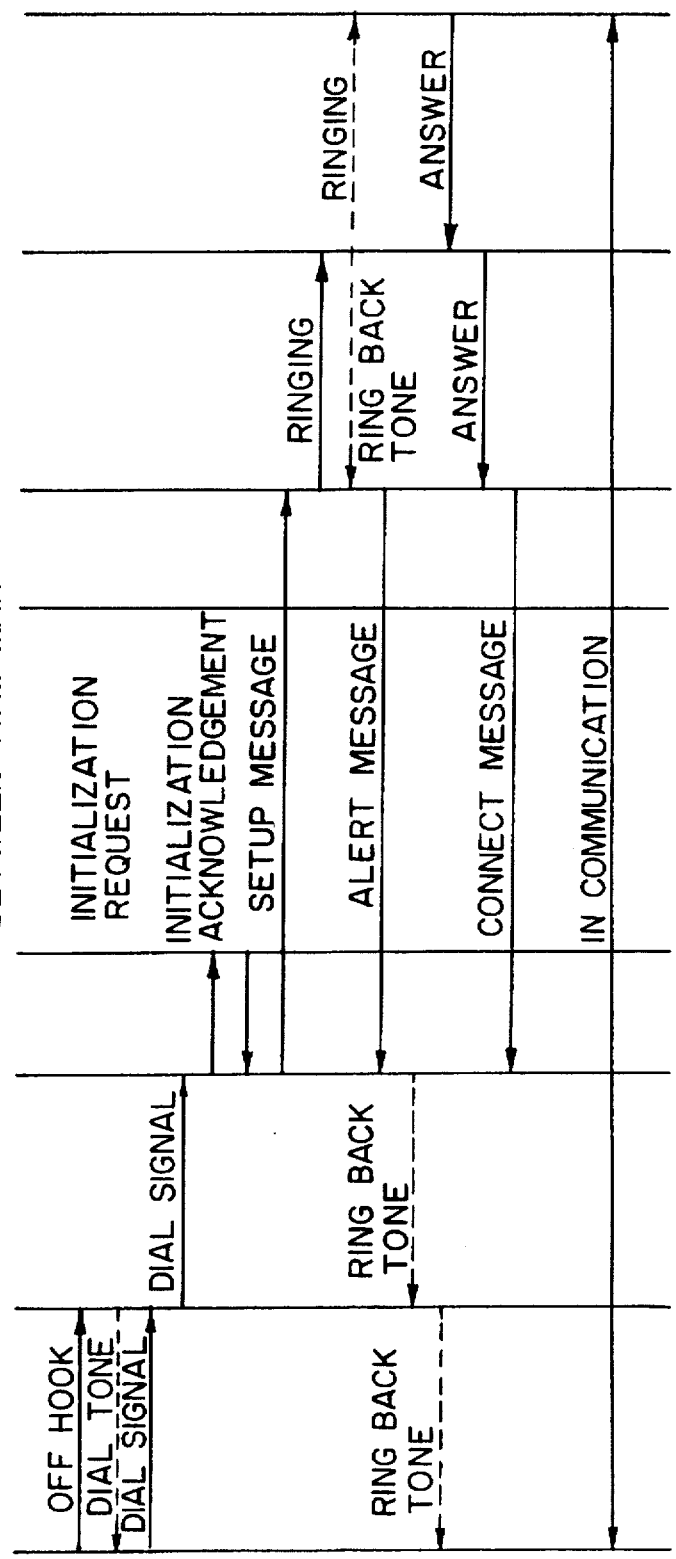

A call sending procedure from the PBX 20 is as follows. The PBX 20 dials a telephone number (subscriber number) of a called terminal connected to another PBX. Then the PBX 20 determines whether or not the two wires L1 and L2 from the trunk 200 have the inverted polarities, in other words, determines whether or not the two wires L1 and L2 are in a called state. When it is determined that the wires L1 and L2 do not have the inverted polarities, the PBX 20 makes a loop including the wires L1 and L2 via the trunk 200. Then, a sequence as shown in FIG. 10 is carried out.

When the PBX 21 detects an answer from the called terminal, the polarities of the wires L1 and L2 are inverted.

A call accepting procedure for a call from another PBX to the PBX 20 is as follows. When the PBX 20 receives a call from a calling PBX, the speech terminal interface unit 213 inverts the polarities of the wires L1 and L2 connected to the trunk 200 in the PBX 20. Then the calling PBX sends a dial tone to the PBX 20. The PBX 20 detects the dial tone, and makes a loop including the two wires L1 and L2.

In the case where the analog interface is used, it is determined, before a calling request is sent, whether or not each pair of wires L1 and L2 is in the called state, that is, whether or not each pair of wires L1 and L2 is in the polarity inverted state. Hence, the call accepting procedure has priority over the call sending procedure.

When the speech terminal interface unit 213 in the ATM multiplexing transmission unit 21 has the congestion control command from the controller 210, it inverts the polarity of each pair of wires L1 and L2 which wires are idle by means of a built-in power supply device. Then, the ATM adaptation layer unit 212 stores data indicating each pair of wires L1 and L2 whose polarity has been inverted. The PBX 20 is informed of the data indicating the pairs of wires L1 and L2 respectively having the inverted polarities, and it then disables the trunks 200 connected to the pairs of wires L1 and L2 having the inverted polarities. Hence, it becomes impossible to send a call to the ATM multiplexing transmission unit 21.

When the speech terminal interface unit 213 receives the congestion control terminating command from the controller 210, the PBX 20 returns the polarities of the pairs of wires L1 and L2 to the original state (idle state). Hence, the PBX 20 is permitted to send a call.

A description will now be given of the digital interface. Time division multiplexing transmission is carried out between the time division multiplexing unit 14 shown in FIG. 2B and the ATM adaptation layer unit 17. The above digital interface is known as a PBX-TDM digital interface.

FIG. 6A shows a 2Mbps frame structure, and FIG. 6B is a multiframe structure of signaling time slots. Referring to FIG. 6A, one frame is equal to 125 μm, and 32 time slots (time slot numbers 0–31), that is, 32 channels. Time slot number 0 is a signaling time slot, and 30 time slots (time slot numbers 1–15 and 17–30) are information time slots used for transferring digital speech information. Time slot number 16 is a reserved time slot. The signaling time slot (No. 0) includes a framing bit F located at the MSB (Most Significant Bit), a multiframing bit MF adjacent to the framing bit F, and a supervisory (alarm) bit S adjacent to the multiframing bit MF. According to the embodiment of the present invention, five consecutive bits subsequent to the supervisory bit S are used to transfer the aforementioned traffic information indicating the current states of the channels. The last bit of the above five consecutive bits is the LSB (Least Significant Bit).

Referring to FIG. 6B, the five low-order bits respectively contained in the second to seventh frames in the multiframe structure are assigned to transfer of the traffic information indicating the current states of the 30 channels. That is, bits (signaling bits) A1–A5, A6–A10, . . . A26–A30 are used for transferring traffic information concerning the 30 channels.

Figures 7A, 7B:
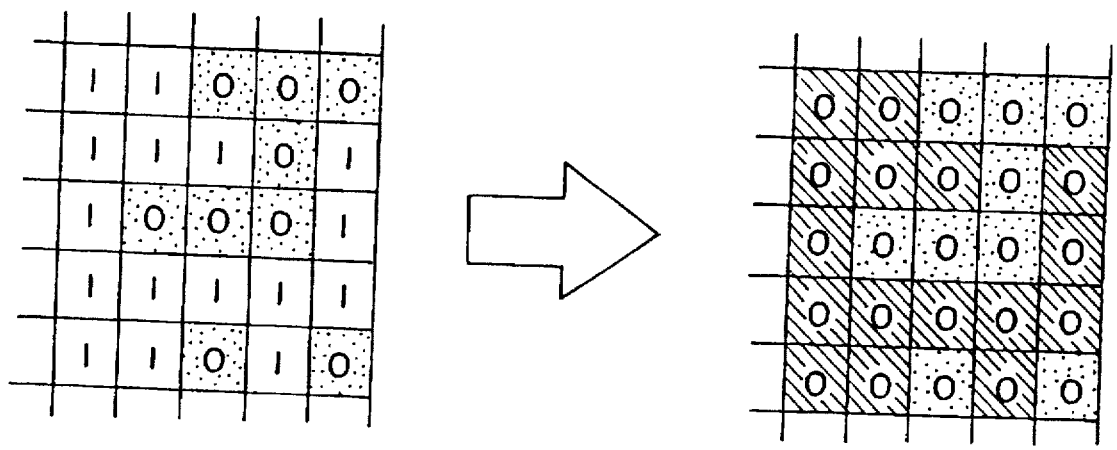
FIG. 7A is a diagram showing the setting of signaling bits.
FIG. 7B is a diagram showing how the signaling bits are controlled when a transmission line is congested with traffic.

FIG. 7A shows the setting of the above signaling bits. Each of the signaling bits is set to "1" when the corresponding channel is idle, and is set to "0" when the corresponding channel is busy or blocked. In response to receipt of the congestion control starting command from the controller 210 of the ATM transmission unit, the ATM adaptation layer unit 212 sets the signaling bits that are currently set to "1" to "0". Thereby, all the 30 signaling bits are equal to "0", as shown in FIG. 7B. These signaling bits are detected on the PBX side, and the PBX understands that there are no available channels. In response to receipt of the congestion control terminating command from the controller 210, the ATM adaptation layer unit 212 sets to 1 the signaling bits which were changed to "0" in response to receipt of the congestion control starting command.

It is expected that the existing terminals and transmission units are continuously used for a while after the ATM networks enter into practical use. Under a circumstance such that the ATM technology is applied to only transmission paths while conventional exchanges are used, it is necessary to establish compatibility between the ATM transmission paths and the existing exchanges without providing specific modules in the exchanges. According to the present invention, the PBXs (which are independent of the ATM technology) are informed of the state of the ATM transmission path in which information is statistically multiplexed, and hence the maximum capability of each ATM multiplexing transmission unit can be utilized.

A further description will now be given of the second embodiment of the present invention using the digital interface.

Figure 8:
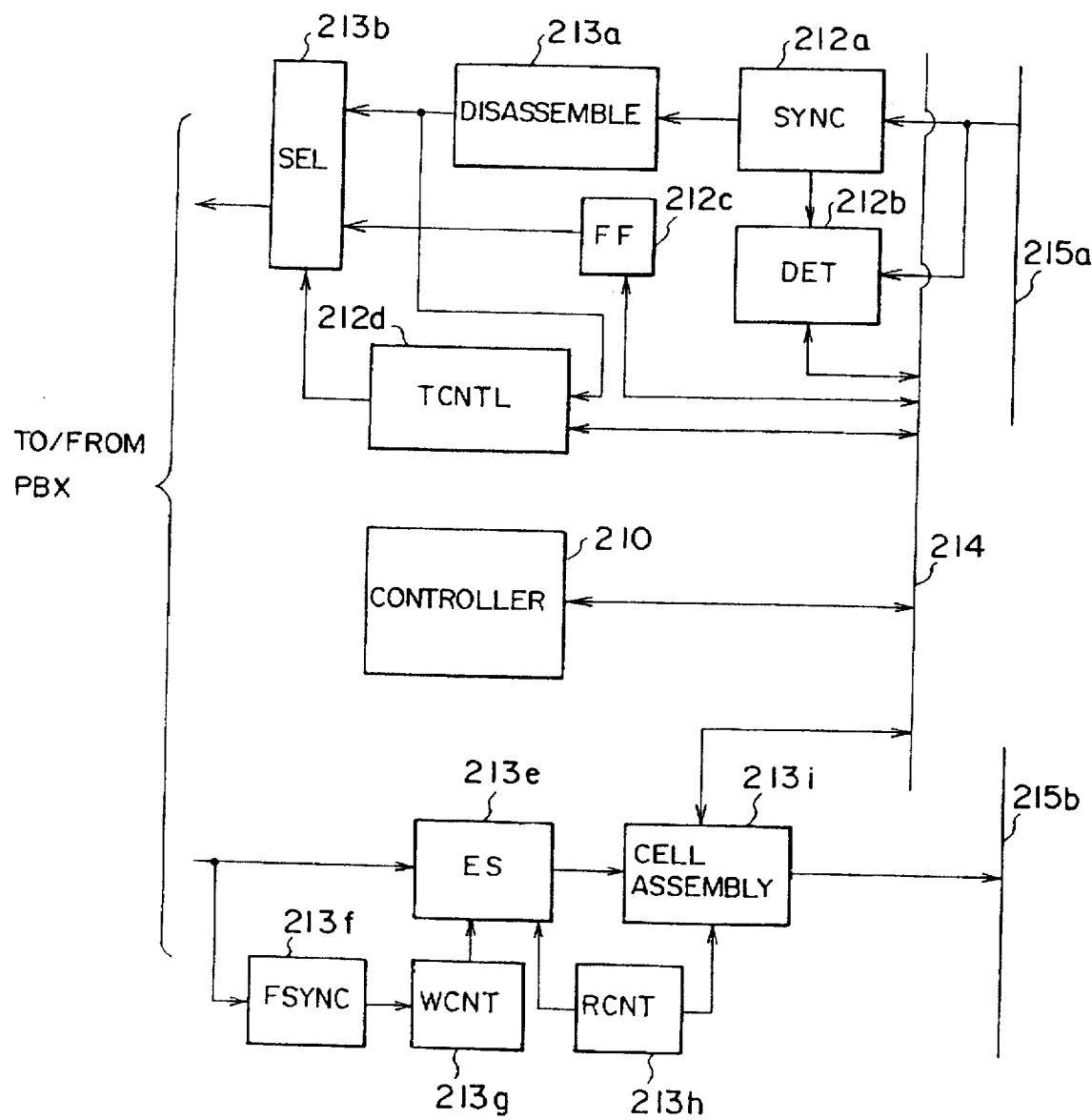
FIG. 8 is a block diagram showing an ATM adaptation layer unit and a speech terminal interface unit shown in FIG. 3B.

FIG. 8 shows the details of the ATM adaptation layer unit 212 for speech transmission and the speech terminal interface unit 213 shown in FIG. 3B. The ATM adaptation layer unit 212 comprises a cell synchronizing unit (SYNC) 212a, a flip-flop (FF) 212c, a header detection unit (DET) 212b, a timing controller (TCNTL) 212d. The speech terminal interface unit 213 comprises a cell disassembling unit 213a, a selector (SEL) 213b, an elastic store memory (ES) 213e, a frame synchronizing unit (FSYNC) 213f, a write address counter (WCNT) 213g, a read address counter (RCNT) 213h, and a cell assembling unit 213i. The cell synchronizing unit 212a outputs, at a predetermined timing, information contained in the information field of each cell transferred from a bus line 215a of the data bus 215. The header detection unit 212b detects the ATM header of each cell transferred from the bus line 215a by using a timing signal from the cell synchronizing unit 212a.

The cell disassembling unit 213a disassembles the information contained in the information field into PCM speech data, which data is then output to the selector 213b and the timing controller 213c. The controller 210 receives the traffic information from the traffic monitoring controller TMC shown in FIG. 3C via the control bus 214, and controls the flip-flop 212d. Where the controller 210 determines that the ATM cell transmission line has been filled with traffic, the controller 210 controls the flip-flop 212c so that it generates a flag signal indicating a value of 1. The flag signal generated by the flip-flop 212c is output to the selector 213b. Further, the controller 210 outputs to the timing controller 212d the command for starting the congestion control operation. In response to receipt of this command, the timing controller 212d controls the selector 213b so that the selector 213b selects the flip-flop 212c at a timing corresponding to the signaling timing slot. In the above manner, all the signaling bits are set to 1.

When the controller 210 understands, on the basis of the traffic information, that some channels has become available, the controller 210 resets the flip-flop 212c to zero, and controls the timing controller 212d so that the selector 213b always selects the cell disassembling unit 213a.

PCM data from the PBX is applied to the elastic store memory 213e and the frame synchronizing unit 213f. Under control of the frame synchronizing signal 213b, the write address counter 213g generates a write address signal, which is applied to the elastic store memory 213e. The PCM data is written into a storage area specified by the write address. PCM data specified by a read address generated by the read address counter 213h is read from the elastic store memory 213e and is then applied to the cell assembling unit 213i. The cell assembling unit 213 generates an ATM cell from the readout PCM data, and outputs it to a bus line 215b of the data bus 215.

FIG. 9 shows the detail of the PBX. The PBX shown in FIG. 9 comprises an elastic store memory (ES) 301, a frame synchronizing unit (FSYNC) 302, a write address counter (WCNT) 303, a read address counter (RCNT) 304, a demultiplexer (DMUX) 305, a switch (SW) 306, and a call processor (CPR) 307. Further, the PBX comprises interface units (INF) 308, 309 and 310, a line processor (LPR) 311, a timing controller (TCNTL) 312, and a multiplexer (MUX) 313.

Under control of the frame synchronizing unit 302, PCM data from the ATM multiplexing transmission unit is written into a storage area specified by a write address generated by the write address counter 303. PCM data specified by a read address generated by the read address counter 304 is read from the elastic store memory 301, and is then applied to the demultiplexer 305. Normally, the demultiplexer 305 selects the switch 306, and thus the PCM data is transferred to the switch 306. When the read address counter 304 generates a read address corresponding to the signaling time slot (No. 0), the demultiplexer 305 selects the register 308. The signaling bit obtained for each frame is transferred to the line processor 311 via the interface unit 308. Of course, control information other than speech information is transferred to the line processor 311 via the interface unit 308. When the line processor 311 determines that all the signaling bits received indicate values of 1, the line processor 311 understands that the transmission line has been filled with traffic, and informs the call processor 307 of this fact via the interface unit 309. The call processor 307 inhibits calling from the PBX to the ATM multiplexing transmission unit.

PBX data to be transferred to the ATM multiplexing transmission unit is supplied from the switch 306 to the multiplexer 313. The line processor 311 supplies control information to the multiplexer 313 via the interface unit 310. The line processor 311 controls the timing controller 312, which controls the multiplexer 313 so that the control information from the interface unit 310 is added to the PCM data.

The present invention is not limited to the specifically disclosed embodiments, and variations and modifications may be made without departing from the scope of the present invention.

What is claimed is:

1. A congestion control system for controlling congestion in an interface between a PBX (Private Branch Exchange) and an ATM (Asynchronous Transfer Mode) multiplexing transmission unit which is connected to an ATM network via an ATM transmission line, said congestion control system comprising:

congestion detecting means positioned in said ATM multiplexing transmission unit, for detecting a congested state in which the ATM transmission line is congested with traffic; and control means, coupled to said congestion detecting means, for congestion control operation such that when the congested state is detected by the congestion detecting means said control means produces a pseudo busy state which is detected at said PBX and inhibits a call from the PBX from being sent to the ATM transmission line via the ATM multiplexing transmission unit in response to said pseudo busy state.

2. A congestion control system as claimed in claim 1, wherein:
   wherein said PBX is coupled to said ATM multiplexing transmission unit by a two-wire transmission line; and further comprising
   means for setting two wires of said two-wire transmission line to polarities corresponding to a busy state.

3. A congestion control system as claimed in claim 1, wherein
   said PBX and said ATM multiplexing transmission unit are coupled to each other by a multiplexed digital transmission line; and
   the congestion control system further comprising managing means for managing signaling bits respectively indicating states of channels and contained in signals to be transferred through said digital transmission line; and wherein:
   said congestion detecting means is coupled to said managing means and comprises means for setting all the signaling bits to values indicating busy states of the channels when the congested state of the ATM transmission line is detected; and
   said control means comprises means for detecting that all the signaling bits have been set to said values and for inhibiting a call from the PBS from being sent to the ATM transmission line via the ATM multiplexing transmission unit when it is detected that all the signaling bits have been set to said values.

4. A congestion control system as claimed in claim 3, wherein said managing means is positioned in said ATM multiplexing transmission unit.

5. A congestion control system as claimed in claim 1, wherein:
   said control means is provided in said PBX.

6. A congestion control system as claimed in claim 1, wherein said control means is positioned in said ATM multiplexing transmission unit.

7. A congestion control system as claimed in claim 6, and further comprising a means positioned in said ATM multiplexing transmission unit, for notifying said control means of traffic information in the ATM transmission line at fixed time intervals.

8. A congestion control system as claimed in claim 1, wherein an analog transmission line connects said PBX to said ATM multiplexing transmission unit, and said control means is positioned in the PBX; and further comprising a polarity inverting unit positioned in said ATM multiplexing transmission unit and being coupled to said congestion detecting means to receive a congestion detection signal therefrom and inverting, in response to said signal, polarity of said analog transmission line, said PBX detecting inversion of polarity of said analog transmission line and notifying said control means of said inversion so that said control means inhibits the call from the PBX.

9. A congestion control unit as claimed in claim 1, wherein a multiplexed digital transmission line connects the PBX to said ATM multiplexing transmission unit, and said control means is positioned in the PBX; and further comprising time division multiplexing transmission executing means connected to said congestion detecting means to receive a congestion detecting signal therefrom and in response thereto, transferring signals indicating that all channels in the digital transmission line are busy to said control means.

10. A congestion control method for controlling congestion in an interface between a PBX (Private Branch Exchange) and an ATM (Asynchronous Transfer Mode) multiplexing transmission unit which is connected to an ATM network via an ATM transmission line, said congestion control method comprising the steps of:
   (a) detecting a congested state in which the ATM transmission line is congested with traffic by said ATM multiplexing transmission unit; and
   (b) controlling congestion such that when a congested state is detected a pseudo busy state is created, and detecting said pseudo busy state at said PBX and inhibiting a call from the PBX from being sent to the ATM transmission line via the ATM multiplexing transmission unit in response to said pseudo busy state.

11. A congestion control method as claimed in claim 10, wherein:
   said PBX and said ATM multiplexing transmission unit are coupled to each other by a multiplexed digital transmission line;
   said congestion control method comprises the step (c) of managing signaling bits respectively indicating states of channels contained in signals to be transferred to the digital transmission line;
   said step (a) comprises the step of setting all the signaling bits to values indicating busy states of the channels when the congested state of the ATM transmission line is detected; and
   said step (c) comprises the step of detecting that all the signaling bits have been set to said values and inhibiting a call from the PBX from being sent to the ATM transmission line via the ATM multiplexing transmission unit when it is detected that all the signaling bits have been set to said values.

12. A congestion control method for controlling congestion in an interface between a PBX (Private Branch Exchange) and an ATM (Asynchronous Transfer Mode) multiplexing transmission unit which is connected to an ATM network via an ATM transmission line, said congestion control method comprising the steps of:
   (a) detecting a congested state in which the ATM transmission line is congested with traffic by said ATM multiplexing transmission unit; and
   (b) controlling congestion such that when a congested state is detected a call is inhibited from the PBX from being sent to the ATM transmission line via the ATM multiplexing transmission unit, wherein:
   a two-wire transmission line connects the PBX and the ATM multiplexing transmission unit to each other; and
   said step (b) comprises the step of setting two wires of said two-wire transmission line to polarities corresponding to a busy state.

13. An ATM (Asynchronous Transfer Mode) transmission unit connected to a telephone exchange through a synchronous transfer mode channel, for interfacing the synchronous transfer mode channel to an ATM network, the ATM transmission unit comprising:
   congestion detecting means for detecting a congested state of the ATM network;
   control means, in response to information of the congested state from the congestion detecting means, for producing a pseudo busy state and notifying the telephone exchange that the synchronous transfer mode channel is to be treated as being in a busy state.

14. A transmission unit for converting data of a telephone call in a synchronous transfer mode from a telephone exchange into a plurality of fixed length cells each having a header field and an information field provided with the data, and for transmitting a fixed length cell to a network, the transmission unit comprising:

a controller which detects a congested state of the network and in response to said detected state produces a pseudo busy state; and an interface for regulating, in response to information indicative of the congested state and the pseudo busy state from the controller, a telephone call through a synchronous transfer mode channel, said interface notifying the telephone exchange that the synchronous transfer mode channel is to be treated as being in a busy state.

15. A congestion control method for an ATM (Asynchronous Transfer Mode) transmission unit, connected to a telephone exchange through a synchronous transfer mode channel, for interfacing the synchronous transfer mode channel to an ATM network, the method comprising the steps of:

detecting a congested state of the ATM network;

producing a pseudo busy state in response to said congested state;

notifying the telephone exchange that the synchronous transfer mode channel is to be treated as being in a busy state, in response to information indicative of the pseudo busy state and the congested state of the ATM network; and regulating a telephone call through the synchronous transfer mode channel in response to said pseudo busy state.

16. A communication system comprising:

a telephone exchange; and a transmission unit converting data of a telephone call in a synchronous transfer mode from the telephone exchange into a plurality of fixed length cells each having a header field and an information field provided with the data, and transmitting a fixed length cell to a network, the transmission unit including:

a controller which detects a congested state of the network and in response to said detected state produces a pseudo busy state; and an interface for regulating, in response to information indicative of the congested state and the pseudo busy state from the controller, a telephone call through a synchronous transfer mode channel, said interface notifying the telephone exchange that the synchronous transfer mode channel is to be treated as being in a busy state.

17. A congestion control method for a transmission unit converting data of a telephone call in a synchronous transfer mode from the telephone exchange into a plurality of fixed length cells each having a header field and an information field provided with the data, and transmitting a fixed length cell to a network, the method comprising the steps of:

detecting a congested state of the network;

producing a pseudo busy state in response to said congested state;

notifying the telephone exchange that the synchronous transfer mode channel is to be treated as being in a busy state, in response to information indicative of the pseudo busy state and the congested state of the network; and regulating a telephone call through the synchronous transfer mode channel in response to said pseudo busy state.

* * * * *